UNITED STATES PATENT OFFICE.

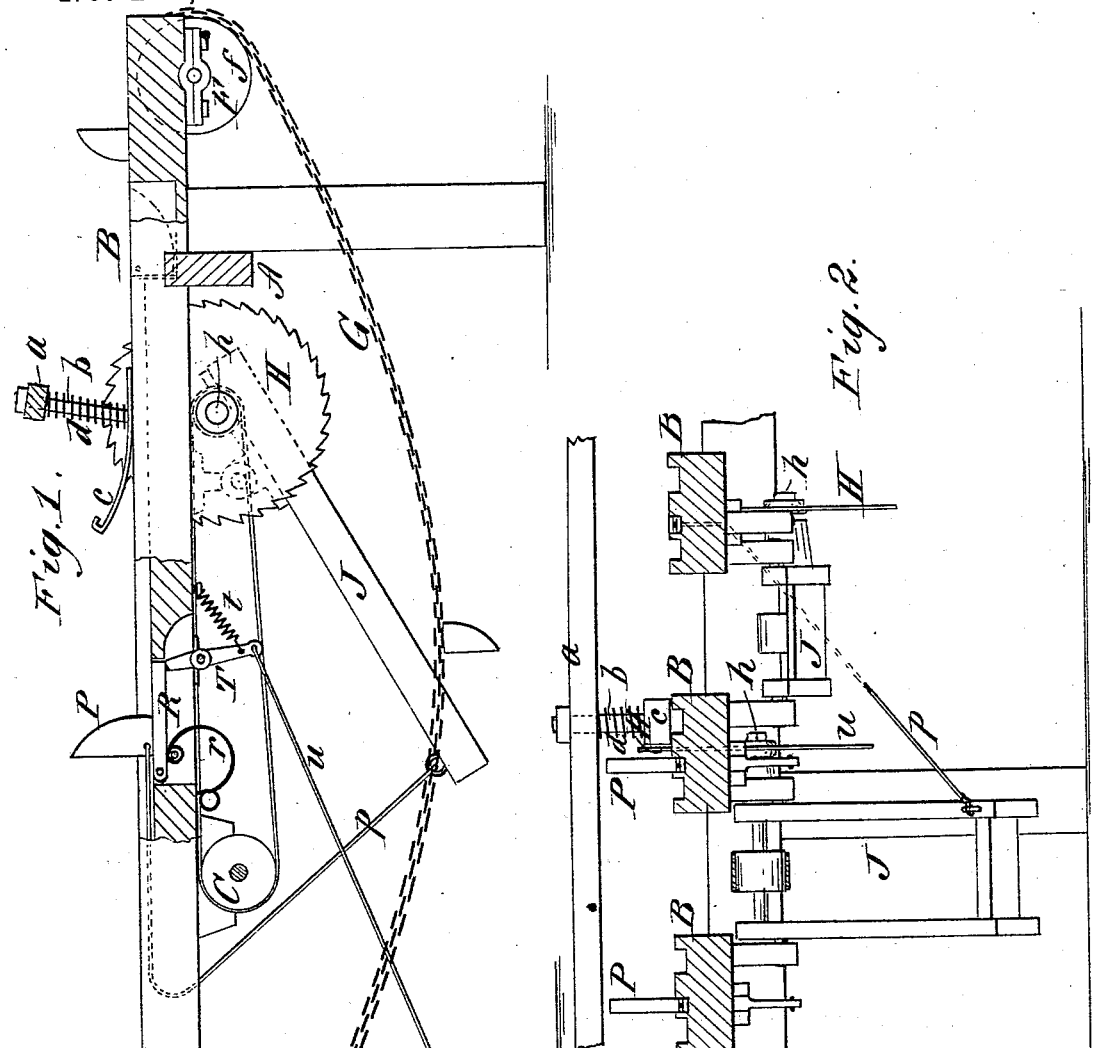

WILLARD B. SWARTWOUT, OF THREE RIVERS, MICHIGAN.

LUMBER-TRIMMING MACHINE.

SPECIFICATION forming part of Letters Patent No. 279,040, dated June 5, 1883.

Application filed January 20, 1883. (No model.)

*To all whom it may concern:*

Be it known that I, WILLARD B. SWARTWOUT, of Three Rivers, in the county of St. Joseph and State of Michigan, have invented a new and Improved Lumber-Trimming Machine, of which the following is a full, clear, and exact description.

My present invention is an improvement upon the lumber-trimming machine shown in Letters Patent granted to me November 29, 1881, No. 250,174, in which machine the saws are arranged for cutting the lumber or boards into standard lengths, certain of the saws being thrown automatically out of action, according to the length of the lumber.

The object of my present invention is to provide for throwing the automatic mechanism in and out of action by hand or foot, as may be required; and it consists in the construction and arrangement of parts, as hereinafter described and claimed.

Reference is to be had to the accompanying drawings, forming part of this specification, in which similar letters of reference indicate corresponding parts in both the figures.

Figure 1 is a longitudinal vertical section of my improved machine. Fig. 2 is a transverse section of the same.

A are the transverse beams, and B are the longitudinal rails of the frame. C is the driving-shaft. F F are horizontal shafts at the ends of the frame, carrying sprocket-wheels $f$ and the endless feeding-chain G. H are the saws, carried by arbors $h$, which are journaled at one end of pivoted frames J, the frames being hung from hangers on the under side of the rails B. These parts are substantially the same as shown in the Letters Patent aforesaid. The frames J are sustained by cords or chains $p$, that pass from the outer ends of the frames around friction-rollers to the upper side of the rails B, and the ends of the cords or chains are connected to slide-blocks P, that are fitted for movement lengthwise upon the rails. The cord or chain from the frame of the first saw is attached to the block P that is upon the rail in which the second saw works, and the frame of the second saw is connected to the block on the rail of the third saw. At the point in each rail B where the block P rests when the saw-frame is downward is an aperture in which is pivoted a trap, R, that is held upward by a coil-spring, $r$, so as to form a support for the block. Beneath the trap R is a pivoted latch, T, provided with a spring, $t$, that tends to retain the latch beneath the trap, so as to prevent the trap from moving down. A rod, rope, or chain, $u$, is connected to the lower end of the latch T, and passed to a convenient place for operation to move the latch from beneath the trap. The recess in the rail is made large enough to allow the block P to turn therein when the trap is released.

In operation the lumber or boards to be sawed are carried along by the feeding-chains, and if the piece is not of sufficient length to reach the second saw the end is cut off by the first saw. If it is long enough to reach the second saw, its end, coming in contact with the block P on the second rail, will carry the block forward, and thus raise the frame of the first saw and depress that saw below the level of the rails, so that the lumber will be cut only by the second saw; or, in case the piece is long enough to reach the third saw, by the same operation the first and second saws will be depressed. In case it is desired to prevent this depression of either saw—the first one, for instance—the lever or chain $u$ beneath the second saw is to be drawn upon to release the latch T from beneath the trap R, so that when the lumber comes in contact with the block P, instead of carrying the block along and depressing the first saw, the block P is turned down into the recess, the trap R giving way, so that the first saw remains in its elevated position and the lumber is cut off shorter than it would have been if the block had been carried along upon the rail. The block P may be turned down by hand for the same purpose, and in this manner, while providing for the automatic operation of the machine, I also provide for throwing the automatic mechanism out of action, which is desirable in some cases.

For holding the lumber down and preventing it from being raised by the saws, I provide an attachment consisting of a bar, $a$, that may be sustained by standards at the ends of the frame, or suspended from above, and horizontal shoes $c$, carried by the irons $b$, that are fitted to slide through or on the bar. The irons $b$ are squared to prevent turning, and have heads or nuts on their upper ends to limit their downward movement. Springs $d$ on the irons force them and the shoes down on the lumber and depress the shoes to their place after the lumber has passed.

Having thus described my invention, what I claim as new, and desire to secure by Letters Patent, is—

1. The combination, with a swinging saw-frame, a sliding block, and a cord or chain connecting said frame and block, of a trap adapted to support said block and permit the latter to be forced beneath the upper surface of the rail when desired, substantially as shown and described.

2. In lumber-trimming machines, the combination, with the slide-blocks P, that are connected to the swinging saw-frames, of the trap R and latch T, arranged for allowing the blocks to be forced below the bed of the machine when the latch is moved from beneath the trap, substantially as shown and described.

3. The combination, with the swinging saw-frame J, sliding block P, and cord or chain $p$, connecting said frame and block, of the hinged trap R, pivoted latch T, springs $r$ $t$, the former spring, $r$, bearing against the trap R, and the latter spring, $t$, connecting the lower end of the latch with the main frame, and cord or chain $u$, substantially as shown and described.

4. The combination, with the swinging saw-frames J and rails B, of the horizontal bar $a$, supported at its ends, squared irons $b$, passing through holes in the bar $a$, and provided with nuts on their upper ends, and shoes $c$, secured to the lower ends of the irons, and spiral springs $d$, forcing the irons and the shoes down on the lumber, substantially as shown and described.

WILLARD B. SWARTWOUT.

Witnesses:
 J. P. McKey,
 C. L. Blood.